United States Patent [19]

Hefner, Jr.

[11] 4,409,360
[45] Oct. 11, 1983

[54] UNSATURATED POLYESTERS CONTAINING DICYCLOPENTADIENE IN THE FORM OF ITS ESTERS AND ETHERS

[75] Inventor: Robert E. Hefner, Jr., Lake Jackson, Tex.

[73] Assignee: The Dow Chemical Company, Midland, Mich.

[21] Appl. No.: 422,323

[22] Filed: Sep. 23, 1982

[51] Int. Cl.³ ............................................. C08K 5/04
[52] U.S. Cl. .................................. 524/804; 524/819
[58] Field of Search .............. 528/298, 301, 303, 304; 524/804, 819, 822, 823, 832, 846; 525/152, 165, 168, 174, 445

[56] References Cited

U.S. PATENT DOCUMENTS

| | | | |
|---|---|---|---|
| 2,393,609 | 1/1946 | Bruson | 568/612 |
| 2,393,610 | 1/1946 | Bruson | 568/612 |
| 4,246,367 | 1/1981 | Curtis | 528/298 X |
| 4,309,519 | 1/1982 | Obara et al. | 528/298 X |
| 4,360,634 | 11/1982 | Nelson | 528/298 X |

Primary Examiner—Lucille M. Phynes
Attorney, Agent, or Firm—B. G. Colley

[57] ABSTRACT

Unsaturated polyesters resins are prepared having improved flexural strength, corrosion resistance, and heat resistance by incorporating into the resins a dicyclopentadiene ether compound having one of the formulas

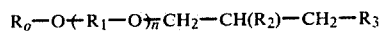

I.

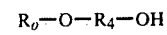

II.

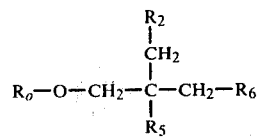

III.

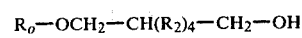

IV.

where
$R_o$ = dicyclopentadienyl
$n = 0-2$
$R_1 = -C_xH_{2x}-(O-C_xH_{2x})_z-$
$x = 1-4$
$z = 0-2$
$R_2 = -OH, -O-R_o$
$R_3 = R_2, -O-CH_2-CH(R_2)-CH_2-R_2$
$R_4 = -C_yH_{2y}-(O-C_yH_{2y})_w-$
$y = 2-4$
$w = 0-2$
$R_5 = R_2, -CH_2-OH, -CH_2-O-R_o, -CH_3,$ or $-H$
$R_6 = -OH, -CH_2-OH, -CH_2-O-R_o, -O-R_o,$
$-(O-C_yH_{2y})_w-OH;$ and wherein
$R_2, R_3, R_5$ and $R_6$ are chosen so that each compound has at least one hydroxyl group, with the proviso that the combined moles of (D) and (E) are in the range of 0.30 to 2.2 moles per mole of (A).

9 Claims, No Drawings

UNSATURATED POLYESTERS CONTAINING DICYCLOPENTADIENE IN THE FORM OF ITS ESTERS AND ETHERS

BACKGROUND OF THE INVENTION

This invention relates to unsaturated polyester resins which contain dicyclopentadiene ether and ester functionality. These unsaturated polyesters possess some properties which are outside the range of properties defined by unsaturated polyesters containing only dicyclopentadiene ether or dicyclopentadiene ester functionality alone.

It is known from U.S. Pat. No. 4,148,765 dated Apr. 10, 1979 and U.S. Pat. No. 4,233,432 dated Nov. 11, 1980 that unsaturated polyester resins containing dicyclopentadiene (DCPD) can be prepared which have most of the DCPD incorporated into the resin by esterification and little, if any, etherification.

SUMMARY OF THE INVENTION

It now has been discovered that the prior art resins can be improved by the incorporation of DCPD into the resin molecules by etherification to achieve higher levels of DCPD ether functionality with improvements in flexural strength, corrosion resistance, and heat resistance.

This higher level of DCPD ether functionality is achieved by reacting an ethylenically unsaturated polycarboxylic acid and/or anhydride, DCPD, water, a polyol, and a DCPD ether compound having at least one free hydroxyl group.

The unsaturated polyester resins of this invention are thus prepared by reacting under resin forming conditions (A) an alpha, beta ethylenically unsaturated polycarboxylic acid, anhydride, or mixture thereof, (B) about 0.05 to about 1.0 mole dicyclopentadiene, polycyclopentadiene, or a dicyclopentadiene concentrate per mole of (A), (C) about 0.03 to about 10 moles of water per mole of (A), (D) a polyol, and (E) a dicyclopentadiene ether compound having one of the formulas

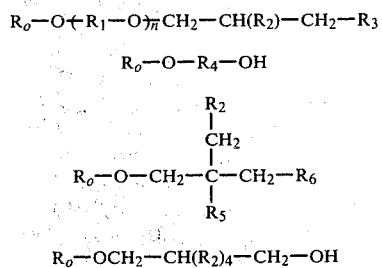

where
$R_0$ = dicyclopentadienyl
$n = 0-2$
$R_1 = -C_xH_{2x}-(O-C_xH_{2x})_z$
$x = 1-4$
$z = 0-2$
$R_2 = OH, -O-R_0$
$R_3 = R_2, -O-CH_2-CH(R_2)-CH_2-R_2$
$R_4 = -C_yH_{2y}-(O-C_yH_{2y})_w$
$y = 2-4$
$R_5 = R_2, -CH_2-OH, -CH_2-O-R_0, -CH_3,$ or $-H$
$R_6 = -OH, -CH_2-OH, -CH_2-O-R_0, -O-R_0, -(O-C_yH_{2y})_wOH$; and wherein
$R_2$, $R_3$, $R_5$ and $R_6$ are chosen so that each compound has at least one hydroxyl group, with the proviso that the combined moles of (D) and (E) are in the range of 0.30 to 2.2 moles per mole of (A).

The polyester resins thus prepared may be blended with an ethylenically unsaturated monomer and cured either neat or reinforced with fibers. The invention consists of the polyesters and the polyester and ethylenically unsaturated monomer formulations, whether or not cured.

DESCRIPTION OF THE PREFERRED EMBODIMENTS

The preferred α, β-unsaturated polycarboxylic acids or anhydrides that can be used herein include maleic acid, fumaric acid, maleic anhydride or mixtures of these compounds. Such acids are readily available, have good reactivity with the polyol and hydroxy-functional dicyclopentadiene ether compound, and result in products of good properties. Other less preferred polycarboxylic acids include itaconic acid, citraconic acid, mesaconic acid, and the like.

Part of the α, β-unsaturated polycarboxylic acid may be replaced with a saturated or aromatic polycarboxylic acid (anhydride) to vary the crosslinking potential and physical properties of the modified unsaturated polyester. Such acids include the aliphatic acids such as acetic acid and the aromatic acids such as isophthalic acid. Replacement of part of the α, β-unsaturated acid with such acids is commonplace in the polyester art.

Suitable selection of the acid and the amount necessary to achieve a desired purpose will be known to the skilled worker and can be optimized with simple preliminary experiments.

The total amount of acid (anhydride) varies as a function of the total polyol, dicyclopentadiene, and hydroxyfunctional dicyclopentadiene ether compound used.

The polyols used to prepare the polyesters of this invention are those which are reactive with acids and/or anhydrides and may include, for example, ethylene glycol, propylene glycol, diethylene glycol, dipropylene glycol, butanediol, hexanediol, pentaerythritol, triethylene glycol, trimethylol propane, glycerine, or mixtures thereof. Preferably, the polyols used in this invention are glycols such as ethylene glycol, propylene glycol, and/or dipropylene glycol and/or diethylene glycol.

The hydroxyfunctional dicyclopentadiene ether compounds used to prepare the polyesters of this invention are those which are reactive with acids and/or anhydrides and may include, for example, the monodicyclopentadiene ether of ethylene glycol, propylene glycol, diethylene glycol, dipropylene glycol, butanediol, hexanediol, triethylene glycol, trimethylol ethane, trimethylol propane, glycerine; the bis(dicyclopentadiene) ether of trimethylol ethane, trimethylol propane, glycerine, pentaerythritol; the tris(dicyclopentadiene) ether of sorbitol, pentaerythritol, ethoxylated pentaerythritol; or mixtures thereof. Methods for preparing hydroxyfunctional dicyclopentadiene ether compounds are set forth by Bruson in U.S. Pat. Nos. 2,393,609 and 2,393,610.

The dicyclopentadiene concentrate used in this invention is a commercial product generally prepared by dimerizing a crude $C_5$ stream from the cracking of crude mixtures of hydrocarbons as set forth by Gebhart, et al in U.S. Pat. No. 3,557,239 issued Jan. 19, 1971.

These concentrates have as the main reactive components about 60 to about 90 percent by weight of dicyclopentadiene, about 5 to about 30 percent by weight of the mixed Diels-Alder dimers of diolefins such as butadiene, cis and trans piperylene, isoprene, cyclopentadiene, and methyl cyclopentadiene. The remainder of these concentrates generally comprise benzene, cyclopentene, 1,5-hexadiene and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

If desired, relatively pure dicyclopentadiene (90-100%) or polycyclopentadiene (dicyclopentadiene oligomers) can be used herein.

The unsaturated polyesters can be prepared by a variety of techniques. In a preferred method, molten α,β-unsaturated polycarboxylic anhydride is partially hydrolyzed with less than the stoichiometric equivalent of water and reacted with the dicyclopentadiene to form ester of dicyclopentadiene and containing unesterified acid and anhydride. This reaction may conveniently be performed in stages whereby a reactant is added stepwise to control reaction exotherms. The product mixture is then reacted with the polyol. The hydroxyfunctional dicyclopentadiene ether compound may be added to the molten α,β-unsaturated polycarboxylic anhydride or at any time thereafter up to and including addition with the polyol.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before the addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification step.

To the mixture of esterified DCPD and acid and/or anhydride is added the polyol and the hydroxy-functional dicyclopentadiene ether compound. After addition is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten α,β-unsaturated polycarboxylic anhydride is essentially totally hydrolyzed with a stoichiometric or greater equivalent of water and reacted with the dicyclopentadiene to form ester of dicyclopentadiene and containing unesterified acid. This reaction may be conveniently performed in stages whereby a reactant is added stepwise, controlling reaction exotherms. The product mixture is then reacted with the polyol and the hydroxyfunctional dicyclopentadiene ether compound as previously described to result in the desired modified unsaturated polyester.

In a typical procedure, molten maleic anhydride and the stoichiometric or greater equivalent of water are maintained at an elevated temperature of about 60° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification step. The product mixture is then reacted with the polyol and the hydroxyfunctional dicyclopentadiene ether compound as previously described.

Many other alternate methods will be recognized by the skilled worker. For example, maleic anhydride may be added to a mixture of DCPD and water in a reactor. The polyol is added to the mixture of esterified DCPD and acid and/or anhydride as before. The hydroxyfunctional dicyclopentadiene ether compound is added as previously described. Finally, although less preferred, DCPD, maleic anhydride, water, polyol, and the hydroxy functional dicyclopentadiene ether compound may be simultaneously reacted to result in the desired unsaturated polyester.

The polyester is then recovered and blended with an ethylenically unsaturated monomer co-polymerizable with the unsaturated polyester to form a blend wherein the weight ratio of polyester to monomer is in the range from about 4:1 to about 1:1. Such ethylenically unsaturated monomers are well known and include: styrene, α-methylstyrene, chlorostyrene, vinyltoluene, vinyl acetate, ethylacrylate, secbutylacrylate, and like unsaturated monomers or mixtures thereof.

These polyester blends with unsaturated monomers should contain about 20 to about 60 percent by weight and preferably 30 to 50 percent by weight of the monomers based on the weight of the polyester. A small amount of an inhibitor such as tertiary butyl catechol, hydroquinone, or the like may be added to this mixture.

The final blend is a crosslinkable polyester composition which is useful to make laminates, castings or coatings.

The laminates of this invention are made by mixing into the crosslinkable composition free radical forming catalysts in known amounts and adding this mixture to a suitable fibrous reinforcement such as asbestos fibers, carbon fibers, fibrous glass, or inorganic fibers.

Examples of these catalysts are benzoyl peroxide, tertiary butyl hydroperoxide, methylethyl ketone peroxide and the like. It is frequently of value to add accelerators such as cobalt naphthenate, dimethyl aniline, and the like.

The polyester resin is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The unsaturated polyester may be compounded with solvents, pigments or other resinous products and cured to form useful coatings in a manner well known in the art.

The following examples are presented to illustrate but not limit the invention.

EXAMPLE 1

Maleic anhydride (1.0 m) (98.06 g) was charged to a reactor and maintained at 70° C. under a nitrogen atmosphere as a clear, molten, stirred solution. Water (0.30 m) (5.41 g) and 98% dicyclopentadiene (0.075 m) (9.92 g) were added to the reactor. Twenty minutes later additional water (0.10 m) (1.80 g) and dicyclopentadiene (0.075 m) (9.92 g) were added. After fifteen minutes, a third portion of dicyclopentadiene (0.075 m) (9.92 g) was added. Fifteen minutes later, a final portion of dicyclopentadiene (0.075 m) (9.92 g) was added and the temperature controller was set at 110° C. This temperature was reached seven minutes later. After thirty minutes, propylene glycol (0.7093 m) (53.97 g) and the monodicyclopentadienyl ether of glycerin (0.3707 m) (83.17 g) were added to the reactor. The temperature controller was then set at 160° C., nitrogen sparging was increased to 2 LPM (liters per minute), and the steam condensor was started. The 160° C. temperature was achieved twelve minutes later. After two hours of reaction at the 160° C. temperature, the temperature controller was set at 205° C. This temperature was achieved eleven minutes later. After 3.2 hours, a total of 24.75 milliliters of water layer and 0.25 milliliters of organic material were recovered in the steam condensor-Dean Stark trap-cold water condensor assembly. The reactor was cooled to 168° C. and 100 ppm of hydroquinone was added. The unsaturated polyester alkyd was recovered as a clear, pale-yellow colored solid with a final acid number of 23.4.

The polyester alkyd was formulated to provide a 57.0% alkyd-43.0% styrene solution. This solution was used to determine SPI gel characteristics, Brookfield viscosity (25° C.), and a clear, unfilled casting was made for use in heat distortion temperature (ASTM D-648), tensile and flexural strength (ASTM D-638 and D-790), percent elongation, and corrosion resistance evaluations. The casting was cured at room temperature using 1.0% benzoyl peroxide and 0.01% dimethylaniline, followed by postcuring for 2.0 hours at 93° C. Standard tensile (6), flexural (5) and heat distortion temperature (2) test pieces were prepared from the casting. Corrosion test coupons measuring 1.5 by 1.0 by 0.165 inches were prepared from the casting. Accelerated corrosion tests on weighed and measured coupons were performed at 52° C. in toluene for 49.25 hours and at 94° C. in 5% aqueous sodium hydroxide for 114 hours. Five minutes of sample recovery in open room temperature air was allowed prior to measurement of weight, thickness, and Barcol hardness of the exposed test coupons. All Barcol hardness measurements are on the 934-1 scale. Appearance of the sample coupons was unchanged unless otherwise noted. The results of the tests are set forth in Table I.

CONTROL 1

Maleic anhydride (1.0 m) (98.06 g) was charged to a reactor and maintained at 110° C. under a nitrogen atmosphere as a clear, molten, stirred solution. Propylene glycol (0.4358 m) (33.16 g) and the monodicyclopentadienyl ether of glycerin (0.6642 m) (148.98 g) were added to the reactor, the temperature controller was set at 160° C., nitrogen sparging was increased to 2 LPM, and the steam condensor was started. The 160° C. temperature was achieved twelve minutes later. After two hours of reaction at the 160° C. temperature, the temperature controller was set at 205° C. This temperature was achieved eighteen minutes later. After 2.83 hours, a total of 14.0 milliliters of water layer was recovered via the steam condensor-Dean Stark trap-cold water condensor assembly. The reactor was cooled to 168° C. and 100 ppm of hydroquinone was added. The unsaturated polyester alkyd was recovered as a clear, pale-yellow colored solid with a final acid number of 24.3.

The polyester alkyd was formulated to provide a 57.0% alkyd-43.0% styrene solution. Physical and mechanical properties were determined using the method of Example 1. The results are shown in Table I.

CONTROL 2

Maleic anhydride (1.0 m) (98.06 g) was charged to a reactor and maintained at 70° C. under a nitrogen atmosphere as a clear, molten, stirred solution. Water (0.525 m) (9.46 g) and 98% dicyclopentadiene (0.15 m) (19.83 g) were added to the reactor. Twenty minutes later, additional water (0.175 m) (3.15 g) and dicyclopentadiene (0.15 m) (19.83 g) were added. After fifteen minutes, a third portion of dicyclopentadiene (0.15 m) (19.83 g) was added. Fifteen minutes later a final portion of dicyclopentadiene (0.15 m) (19.83 g) was added and the temperature controller was set at 110° C. This temperature was reached five minutes later. After thirty minutes, propylene glycol (0.78 m) (59.63 g) was added to the reactor, the temperature controller was set at 160° C., nitrogen sparging was increased to 2 LPM, and the steam condensor was started. The 160° C. temperature was achieved seven minutes later. After two hours of reaction at the 160° C. temperature, the temperature controller was set at 205° C. This temperature was achieved thirteen minutes later. After 4.28 hours, a total of 26 milliliters of water layer and 0.25 milliliters of organic material was recovered in the steam condensor-Dean Stark trap-cold water condensor assembly. The reactor was cooled to 168° C. and 100 ppm of hydroquinone was added. The unsaturated polyester alkyd was recovered as a clear, pale-yellow colored solid with a final acid number of 26.0.

The polyester alkyd was formulated to provide a 57.0% alkyd-43.0% styrene solution. Physical and mechanical properties were determined using the method of Example 1. The results are shown in Table I.

TABLE 1

|  | Ex. 1 | Cont. 1 | Cont. 2 |
|---|---|---|---|
| Brookfield viscosity-25° C. (cp) | 153 | 252.5 | 55 |
| 264/psi Heat Dist. Temp. (°F.) | 216.5 | 214 | 223 |
| SPI Gel-Test-84° C. |  |  |  |
| gel time (min) | 2.78 | 2.75 | 3.60 |

TABLE 1-continued

|  | Ex. 1 | Cont. 1 | Cont. 2 |
|---|---|---|---|
| cure time (min) | 4.15 | 3.65 | 4.85 |
| max. exotherm (°C.) | 231 | 228 | 221 |
| Average Barcol Hardness | 44.7 | 43.5 | 45.4 |
| Tensile strength × $10^3$ (psi) | 2.307 | 2.147 | 2.447 |
| Elongation (%) | 0.60 | 0.52 | 0.58 |
| Flexural Strength × $10^3$ (psi) | 10.304 | 9.915 | 7.613 |
| Flexural Modulus × $10^5$ (psi) | 5.48 | 5.01 | 5.59 |
| Corrosion Resistance |  |  |  |
| Toluene |  |  |  |
| Change in Barcol hardness (%) | −62.19 | −41.38 | −79.07 |
| Change in weight (%) | +3.65 | +1.94 | +4.16 |
| Change in thickness (%) | +2.94 | +2.79 | +3.62 |
| Appearance | — | — | fractured |
| 5% NaOH |  |  |  |
| Change in Barcol hardness (%) | −32.44 | −35.06 | −38.11 |
| Change in weight (%) | +0.77 | +2.45 | +0.73 |
| Appearance | — | tacky surface | — |

EXAMPLE 2

Sample coupons measuring 1.5 by 1.0 by 0.165 inches were prepared from the clear, unfilled casting of Example 1, Control 1, and Control 2. The coupons were weighed and thickness measured and then placed on a flat, aluminum tray, suspended in a forced air convection-type oven maintained at 240° C. All samples were removed 24 hours later, weighed, and the thickness measured. The results are shown in Table II:

TABLE II

|  | Weight Change (%) | Thickness Change (%) | Appearance |
|---|---|---|---|
| Example 1 | −2.76 | −0.66 | Amber color, superficial hairlines |
| Control 1 | −3.94 | cannot measure | black color, totally fractured |
| Control 2 | −2.17 | −1.12 | amber color, totally fractured |

In Example 1 about 19% of the dicyclopentadiene was incorporated as the monoether and 15% as carboxylic acid ester. In Control 1, all of the dicyclopentadiene (about 34%) was incorporated as the monoether whereas in Control 2 the dicyclopentadiene was incorporated as carboxylic acid ester.

Example 1 clearly demonstrates that incorporation of dicyclopentadiene as a mixture of a polyhydroxyalkyl monodicyclopentadienyl ether and dicyclopentadienyl ester is clearly preferred to the prior art incorporation of dicyclopentadiene as ester only, as shown in Comparative Control 2, or as ether only, as shown in Control 1. Table I shows that the flexural strength of the polyester of Example 1 is significantly higher than that of Control 2. Furthermore, the polyester of Example 1 has higher reactivity as evidenced by the faster gel and cure times and higher maximum exotherm, when compared to the polyester of Control 2. The corrosion resistance to toluene (Table I) and resistance to heat aging (Table II) of the polyester of Control 2 are both less than that of the polyester of Example 1.

Use of the mixed dicyclopentadienyl ether and ester of Example 1 leads to a polyester with mechanical properties equivalent to those of the polyester of Control 1, where only dicyclopentadienyl ether functionality is present. However, the corrosion resistance to 5% aqueous sodium hydroxide (Table I) and the resistance to heat aging (Table II) of the polyester of Control 1 are both substantially less than that of the polyester of Example 1.

CONTROL 3

Maleic anhydride (1.0 m) (98.06 g) was charged to a reactor and maintained at 110° C. under a nitrogen atmosphere as a clear, molten, stirred solution. Then, bis(dicyclopentadienyl ether) of trimethylolethane (0.39 m) (149.98 g) was added to the reactor and the temperature controller was set at 125° C. This temperature was achieved eighteen minutes later. After one hour at the 125° C. temperature, propylene glycol (0.99 m) (75.34 g) was added to the reactor, the temperature controller was set at 160° C., nitrogen sparging was increased to 2 LPM, and the steam condensor was started. The 160° C. temperature was achieved nine minutes later. After two hours of reaction at the 160° C. temperature, the temperature controller was set at 205° C. This temperature was achieved twenty-one minutes later. After 2.12 hours, a total of 22.5 milliliters of water layer was recovered via the steam condensor-Dean Stark trap-cold water condensor assembly. The reactor was cooled to 168° C. and 100 ppm of hydroquinone was added. The unsaturated polyester alkyd was recovered as a clear, pale-yellow colored solid with a final acid number of 20.1.

The polyester alkyd was formulated to provide a 57.0% alkyd-43.0% styrene solution. Physical and mechanical properties were determined using the method of Example 1, except that damage incurred due to toluene exposure necessitated removal of the corrosion test coupon after 24 hours. Initial damage to the toluene test coupon had occurred after only five hours of exposure. This damage was edge attack followed by pitting. The results are shown in Table III.

EXAMPLE 3

Maleic anhydride (1.0 m) (98.06 g) was charged to a reactor and maintained at 110° C. under a nitrogen atmosphere as a clear, molten, stirred solution. Bis(dicyclopentadienyl ether) of trimethylolethane (0.1345 m) (51.73 g) was added to the reactor and the temperature controller was set at 125° C. This temperature was achieved eight minutes later. After one hour at the 125° C. temperature, water (0.4955 m) (8.93 g) was added to the reactor. The 125° C. temperature was reachieved five minutes later, then 98% dicyclopentadiene (0.3955 m) (52.29 g) was added and the temperature controller was set at 110° C. This temperature was achieved three minutes later. After 75 minutes at the 110° C. temperature, propylene glycol (0.85 m) (64.69 g) was added to the reactor, the temperature controller was set at 160° C. nitrogen sparging was increased to 2 LPM, and the steam condensor was started. The 160° C. temperature was achieved nine minutes later. After two hours of reaction at the 160° C. temperature, the temperature controller was set at 205° C. This temperature was achieved fourteen minutes later. After 2.30 hours, a total of 20 milliliters of water layer and 3.0 milliliters of organic material were recovered via the steam condensor-Dean Stark trap-cold water condensor assembly. The reactor was cooled to 168° C. and 100 ppm of hydroquinone was added. The unsaturated polyester alkyd was recovered as a clear, pale yellow colored solid with a final acid number of 24.5.

The polyester alkyd was formulated to provide a 57.0% alkyd-43.0% styrene solution. Physical and mechanical properties were determined using the method of Example 1. Initial damage to the corrosion test coupon occurred after 30 hours of exposure to toluene. This damage was two corner fractures. The test coupon was removed from the toluene after 49.25 hours of exposure. The results are shown in Table III.

TABLE III

|  | Control 3 | Example 3 |
|---|---|---|
| Brookfield viscosity-25° C. (cp) | 60.5 | 140 |
| 264/psi Heat Dist. Temp (°F.) | 188 | 221 |
| SPI Gel-Test-84° C. | | |
| gel time (min) | 4.10 | 4.38 |
| cure time (min) | 6.55 | 6.19 |
| max. exotherm (°C.) | 197 | 226 |
| Average Barcol Hardness | 43.6 | 44.5 |
| Tensile strength × $10^3$ (psi) | 2.310 | 2.360 |
| Elongation (%) | 0.55 | 0.54 |
| Flexural Strength × $10^3$ (psi) | 8.368 | 11.939 |
| Flexural Modulus × $10^5$ (psi) | 5.94 | 5.53 |
| Corrosion Resistance | | |
| Toluene | | |
| Change in Barcol hardness (%) | −96.38 | −75.96 |
| Change in weight (%) | +10.36 | +4.76 |
| Change in thickness (%) | +6.10 | +3.76 |
| Appearance | severe edge attack and pitting | corner fracture |
| 5% NaOH | | |
| Change in Barcol hardness (%) | −37.84 | −31.46 |
| Change in weight (%) | +0.70 | +0.70 |
| Appearance | — | — |

EXAMPLE 4

Resistance to heat aging for the polyesters of Control 3 and Example 3 was evaluated using the method of, and simultaneously in conjunction with Example 2. The results are shown in Table IV.

TABLE IV

| Control 3 | Weight Change (%) | Thickness Change (%) | Appearance |
|---|---|---|---|
| 3 | −3.95 | cannot measure | black color, totally fractured |
| Example 3 | −1.02 | −0.47 | clear, light amber color |

In Control 3, all of the dicyclopentadiene (about 34%) was incorporated as the monohydroxyalkyl, bis(dicyclopentadienyl ether), whereas in Example 3, about 14% of the dicyclopentadiene was incorporated as the bis(dicyclopentadienyl ether) and 20% as carboxylic acid ester. Control 2, in which the dicyclopentadiene was incorporated as carboxylic acid ester, may be directed compared to Control 3 and Example 3. The flexural strength of the polyester of Example 3 is significantly higher than that of Control 3 or Control 2. The resistance to heat aging by the polyester of Example 3 is clearly superior to that of all of the other polyesters of Examples 1, or Controls 1, 2, and 3.

I claim:

1. An unsaturated polyester resin having dicylopentadienyl ether functionality and dicyclopentadienyl ester functionality produced by reacting under resin forming conditions (A) an alpha, beta ethylenically unsaturated polycarboxylic acid, anhydride, or mixture thereof, (B) about 0.05 to about 1.0 mole dicyclopentadiene, polycyclopentadiene, or a dicyclopentadiene concentrate per mole of (A), (C) about 0.03 to about 10 moles of water per mole of (A), (D) a polyol, and (E) an ether compound having one of the formulas $$R_o-O+R_1-O)_n CH_2-CH(R_2)-CH_2-R_3 \quad \text{I.}$$

$$R_o-O-R_4-OH \quad \text{II.}$$

$$R_o-O-CH_2-\underset{\underset{R_5}{|}}{\overset{\overset{R_2}{|}}{\underset{|}{C}}}-CH_2-R_6 \quad \text{III.}$$
$$\phantom{R_o-O-CH_2-}\overset{CH_2}{|}$$

$$R_o-OCH_2-CH(R_2)_4-CH_2-OH \quad \text{IV.}$$

where
$R_0$ = dicyclopentadienyl
$n = 0-2$
$R_1 = -C_xH_{2x}+O-C_xH_{2x})_z$
$x = 1-4$
$z = 0-2$
$R_2 = -OH, -O-R_0$
$R_3 = R_2, -O-CH_2-CH(R_2)-CH_2-R_2$
$R_4 = -C_yH_{2y}+O-C_yH_{2y})_w$
$y = 2-4$
$w = 0-2$
$R_5 = R_2, -CH_2-OH, -CH_2-O-R_0, -CH_3,$ or $-H$
$R_6 = -OH, -CH_2-OH, -CH_2-O-R_0, -O-R_0,$ $+O-C_yH_{2y})_wOH$; and wherein
$R_2$, $R_3$, $R_5$ and $R_6$ are chosen so that each compound has at least one hydroxyl group, with the proviso that the combined moles of (D) and (E) are in the range of 0.30 to 2.2 moles per mole of (A).

2. An unsaturated polyester resin having dicylopentadienyl ether functionality and dicyclopentadienyl ester functionality produced by reacting under resin forming conditions (A) an alpha, beta ethylenically unsaturated polycarboxylic acid, anhydride, or mixture thereof, (B) about 0.05 to about 1.0 mole dicyclopentadiene, polycyclopentadiene, or a dicyclopentadiene concentrate per mole of (A), (C) about 0.03 to about 10 moles of water per mole of (A), (D) a polyol, and (E) an ether compound having the formula $$R_0+O-R_1+O)_n CH_2-CH(R_2)-CH_2-R_3$$

where
$R_0$ = dicyclopentadienyl
$n = 0-2$
$R_1 = -C_xH_{2x}+O-C_xH_{2x})_z$
$x = 1-4$
$z = 0-2$
$R_2 = -OH, -O-R_0$
$R_3 = R_2, -O-CH_2-CH(R_2)-CH_2-R_2$ wherein R$_2$ and R$_3$ are chosen so that each compound has at least one hydroxyl group, with the proviso that the combined moles of (D) and (E) are in the range of 0.30 to 2.2 moles per mole of (A).

3. The unsaturated polyester resin of claim 2 wherein said ether compound is the monodicyclopentadienyl ether of glycerine.

4. An unsaturated polyester resin having dicylopentadienyl ether functionality and dicyclopentadienyl ester functionality produced by reacting under resin forming conditions (A) an alpha, beta ethylenically unsaturated dicarboxylic acid, anhydride, or mixture thereof, (B) about 0.05 to about 1.0 mole dicyclopentadiene, polycyclopentadiene, or a dicyclopentadiene concentrate per mole of (A), (C) about 0.03 to about 10 moles of water per mole of (A), (D) a polyol, and (E) an ether compound having the formula

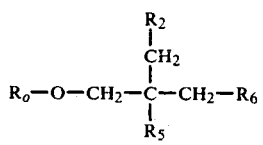

where
R$_0$ = dicyclopentadienyl
R$_2$ = —OH, —O—R$_0$
R$_5$ = R$_2$, —CH$_2$—OH, —CH$_2$—O—R$_0$, —CH$_3$, or —H, and
R$_6$ = —OH, —CH$_2$—OH, —CH$_2$—O—R$_0$, —O—R$_0$, $+$O—C$_y$H$_{2y}$)$_w$OH; and
y = 2-4
w = 0-2
wherein R$_2$, R$_5$ and R$_6$ are chosen so that each compound has at least one hydroxyl group, with the proviso that the combined moles of (D) and (E) are in the range of 0.30 to 2.2 moles per mole of (A).

5. The unsaturated polyester resin of claim 4 wherein said ether compound is the bis(dicyclopentadienyl) ether of trimethylolethane.

6. The unsaturated polyester resin of claims 1, 2, 3, 4, or 5 blended with an ethylenically unsaturated monomer.

7. The unsaturated polyester resin of claims 1, 2, 3, 4, or 5 wherein the ethylenically unsaturated monomer is styrene.

8. The cured compositions of claim 6.

9. The cured compositions of claim 7.

* * * * *

UNITED STATES PATENT AND TRADEMARK OFFICE
CERTIFICATE OF CORRECTION

PATENT NO. : 4,409,360
DATED : October 11, 1983
INVENTOR(S) : Robert E. Hefner, Jr.

It is certified that error appears in the above-identified patent and that said Letters Patent is hereby corrected as shown below:

Col. 6, line 42, "(59.63 g)" should read
-- (59.36 g) --.

Col. 10, line 59, in the formula
"$R_0(O-R_1)-O)_n CH_2-CH(R_2)-CH_2-R_3$"
should read
-- $R_0-O(R_1-O)_n CH_2-CH(R_2)-CH_2-R_3$ --.

Col. 10, line 63, "$R_1=-C_xH_{2x}-O-C_xH_{2x})_z$"
should read
-- $R_1=-C_xH_{2x}(O-C_xH_{2x})_z$ --.

Signed and Sealed this

Twenty-sixth Day of June 1984

[SEAL]

Attest:

GERALD J. MOSSINGHOFF

Attesting Officer

Commissioner of Patents and Trademarks